No. 797,759. PATENTED AUG. 22, 1905.
H. H. SUTRO & L. M. BOOTH.
APPARATUS FOR SOFTENING AND PURIFYING WATER.
APPLICATION FILED MAY 7, 1904.
2 SHEETS—SHEET 1.
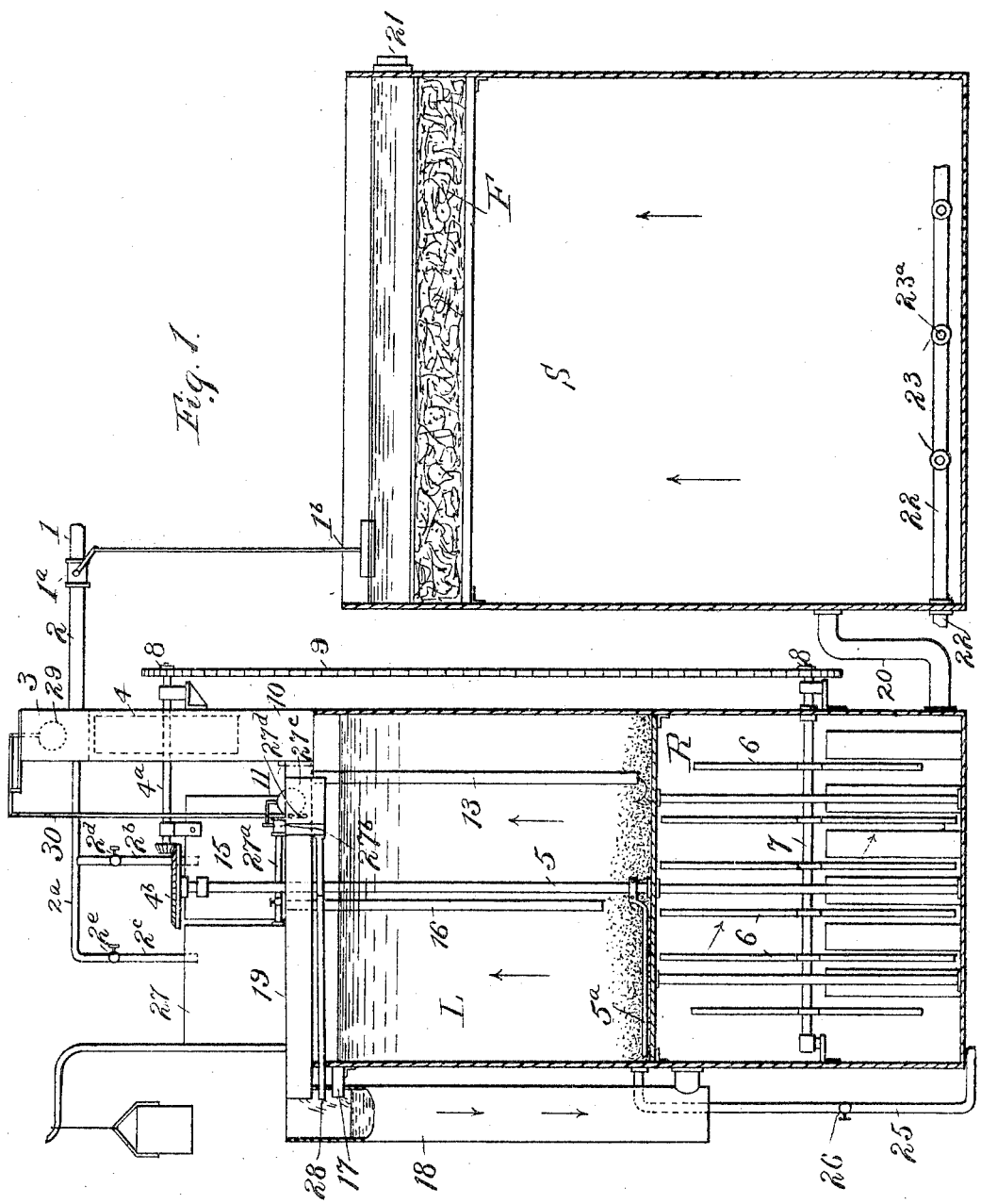

No. 797,759. PATENTED AUG. 22, 1905.
H. H. SUTRO & L. M. BOOTH.
APPARATUS FOR SOFTENING AND PURIFYING WATER.
APPLICATION FILED MAY 7, 1904.
2 SHEETS—SHEET 2.
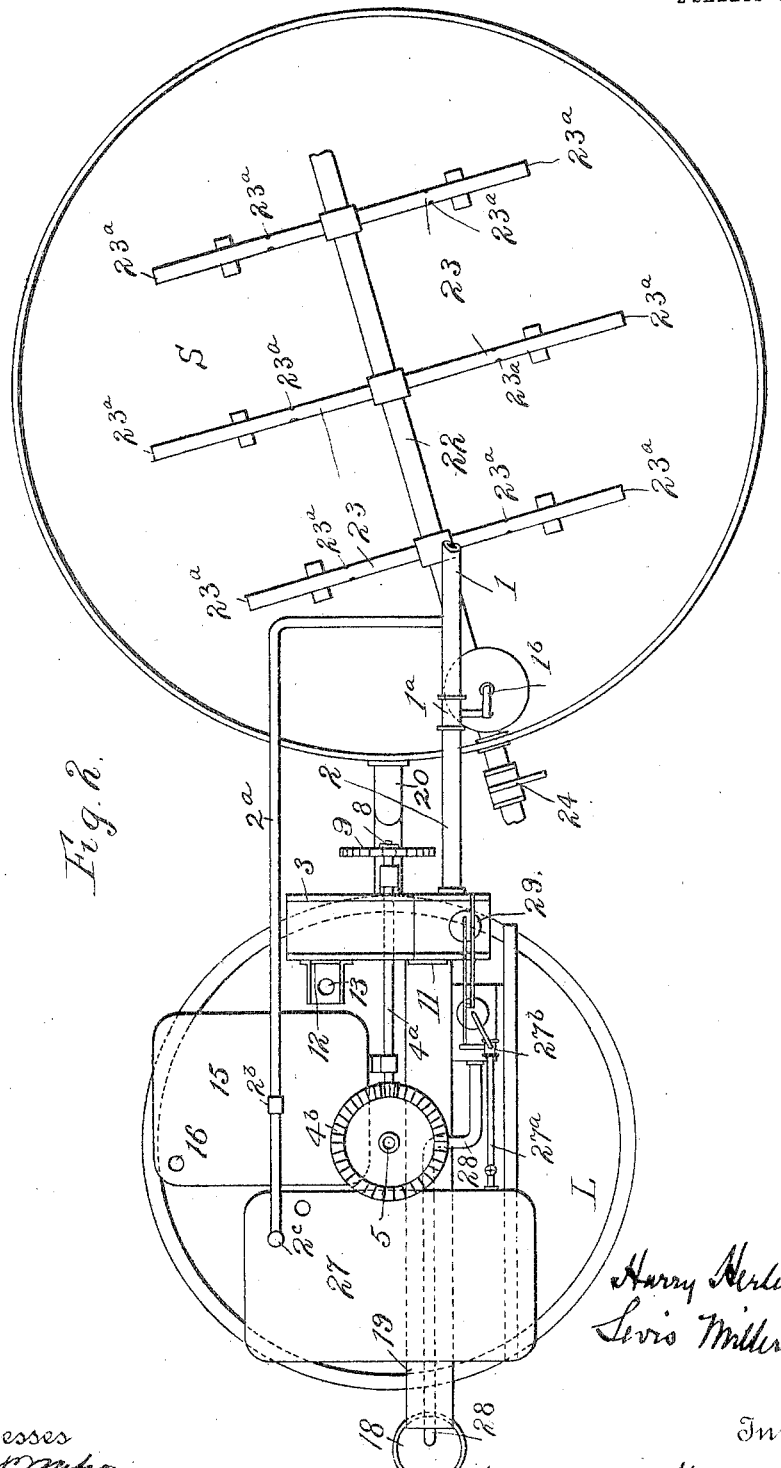

UNITED STATES PATENT OFFICE.

HARRY HERBERT SUTRO, OF NEW YORK, N. Y., AND LEVIS MILLER BOOTH, OF PLAINFIELD, NEW JERSEY.

APPARATUS FOR SOFTENING AND PURIFYING WATER.

No. 797,759. Specification of Letters Patent. Patented Aug. 22, 1905.

Application filed May 7, 1904. Serial No. 206,868.

*To all whom it may concern:*

Be it known that we, HARRY HERBERT SUTRO, of No. 120 West Fifty-seventh street, borough of Manhattan, in the city and State of New York, and LEVIS MILLER BOOTH, of Plainfield, in the county of Union and State of New Jersey, have invented a new and useful Apparatus for Softening and Purifying Water, of which the following is a specification.

The object of our invention is to provide a simple and effective apparatus for softening and purifying water which shall have a large capacity, a small ground area, and which shall thoroughly and effectively mingle the chemical reagents with the water to be purified, which shall be automatic in its action, and which shall be provided with effective means for sludging the precipitates from the settling-tank.

Our invention is particularly described in the following specification and pointed out in the appended claims.

The accompanying drawings represent an apparatus which we have used successfully in carrying our invention into effect.

In the drawings, Figure 1 is a vertical section of an apparatus illustrating the invention. Fig. 2 is a plan view of the same.

1 indicates the inlet for raw water governed by a valve $1^a$ and float $1^b$, so as to regulate the supply according to the amount of water consumed and maintain the treated water at a constant level in the reservoir.

2 is a conducting-pipe leading to a regulating-box 3, located over a chamber 10, containing a water-wheel 4, (shown by dotted lines in Fig. 1,) the shaft $4^a$ of which by bevel-gearing $4^b$ drives a vertical shaft 5, carrying a scraper $5^a$, at the bottom of the lime-water tank L.

R indicates a reaction-tank containing agitators 6 on a shaft 7, which is driven from the water-wheel shaft $4^a$ through the medium of sprocket-wheels 8 and chain 9. The water-wheel box 10 has two outlet-gates 11 12, the latter of which communicates with a descending pipe 13 for delivering a portion of the raw water near the bottom of the lime-tank L.

15 indicates a vat in which lime is slaked and from which the milk of lime is delivered by a pipe 16 to the lower part of the lime-water tank L.

17 indicates an outlet at the upper part of the lime-water tank through which the lime-water is delivered to a mixing-pipe 18, by which it is conveyed to the reaction-tank R, together with the water passing through the gate 11 and chute 19 from the wheel-box 10 and with a regulated proportionate quantity of soda-ash solution or other suitable chemical reagent, according to the nature of the impurities to be removed from the water. This reagent solution is stored in a vat 27 and delivered through a pipe $27^a$ to an auxiliary tank $27^c$, containing a float-valve $27^b$, which maintains the liquid in the auxiliary tank at a constant level. From this auxiliary tank it is delivered through the regulating-valve $27^d$ to a pipe 28, discharging into the mixing-pipe 18. The valve $27^d$ is governed by a float 29 in the regulating-box 3 and connections 30 therefrom, so that the amount of chemical-reagent solution delivered from the vat 27 through the pipe 28 to the mixing-pipe 18 will be automatically regulated to correspond with the quantity of raw water supplied to the apparatus. To this end the regulating-box 3 has a discharge-opening of such form that the amount of water flowing from said box to the water-wheel 4 depends upon the height of water in said box.

The particular location of the regulating-box is immaterial, as the object of this box is to provide means for regulating the flow of chemical reagents by means of a float-valve, and it is therefore only necessary that it should be so located that the whole or a certain definite proportion of the water flowing through the apparatus should pass into this box and flow from it through an opening so constructed that the outflow from the box will be regulated by the height of water contained therein.

Pipes $2^a$ $2^b$ $2^c$, controlled by cocks $2^d$ $2^e$, convey water from the supply-pipe 2 to the lime-slaking vat 15 and chemical-reagent vat 27, respectively.

20 indicates a pipe conveying the treated water from the reaction-tank R to the settling-reservoir S. In order that the water may be thoroughly subjected to the action of the chemical reagent, the outlet 20 is located on a different level from the inlet-pipe 18—that is to say, if the inlet is near the top the outlet will be near the bottom, as herein shown, or if the inlet-pipe 18 is located near the bottom the outlet 20 will be near the top of the reaction-tank.

Near the top of the settling-reservoir S is a filter F, of wood fiber or other material, through which the purified water rises to the outlet 21.

22 represents a sludge-pipe for the discharge of precipitates from the settling-tank S and 23 branch pipes leading thereto distributed over the bottom of the tank. The discharge-pipe 22 and the branch pipes 23 are provided with intake-openings $23^a$. In practice the capacity of the discharge-pipe 22 exceeds the combined capacity of all of the intake-openings leading thereto, and the capacity of each of the branch pipes 23 exceeds the combined capacity of all the intake-openings $23^a$ therein. The sludge-pipe 22 is provided with a valve 24, by means of which precipitates may be sludged out at proper intervals through the discharge-openings $23^a$, which are so distributed over the bottom of the tank as to insure the discharge of practically all the precipitates accumulated thereon.

In operation raw water is supplied through the pipe 2 in quantity regulated by the float $1^b$, so as to correspond with the amount consumed, and passing through the regulating-box 3 falls on the water-wheel 4. Having served its purpose here in driving the agitators 6 in the reaction-tank R and the stirrer or scraper $5^a$ in the bottom of the lime-water tank L the water is divided into two parts, a definite portion flowing through gate 12 and pipe 13 to the bottom of the lime-water tank L and the remainder or principal portion flowing through gate 11 and chute 19 to the mixing-pipe 18. Milk of lime is prepared as occasion requires, usually once in twelve to twenty-four hours, in the lime-slaking vat 15 and conducted by the pipe 16 to the bottom of the lime-water tank L, where the slaked lime is kept in suspension by the stirrer $5^a$ and caused to thoroughly mix with the raw water emerging from the pipe 13. In its slow upward progress through the milk of lime the water dissolves a sufficiency of calcium hydroxid and becomes saturated lime-water. Owing to the absence of agitation in the upper part of the tank L, the liquid there is comparatively quiet, and by the time the overflow 17 is reached all the heavy particles of lime have been left behind and the lime-water issues clear and of constant strength. Flowing through the chute 17, it meets the main body of raw water issuing from the gate 11 in the bottom of the wheel-box and delivered through the chute 19, as well as the proper proportion of soda-ash solution which has previously been prepared in the soda-vat 27. The soda solution is fed into the auxiliary tank $27^c$ and there maintained at a constant level by means of the float-valve $27^b$, and it is discharged from the tank $27^c$ by means of a valve $27^d$, which is operated by means of the float 29 in the regulating-box 3 and connections therefrom, so that the flow of the reagent solution is always proportional to the amount of water to be treated. The water mixed with lime-water and reagent solution passes downward through the mixing-pipe 18 into the reaction-tank R. This tank is of such size as to permit the water to remain in it for a period of an hour, more or less, during which it is thoroughly agitated by the stirrer-bars 6 on the shaft 7, actuated by the flow of the raw water through the agency of the water-wheel, as described. When the water is ready to pass to the settling-tank, all the reactions are completed and the precipitates are in such condition that they will settle very rapidly and subside to the bottom of the settling-tank. The treated water rises slowly in the settling-tank and passes through filter F, where the very small quantity of matter which is carried in suspension is arrested. The water then flows clear and soft from the outlet 21 as required for use. At intervals the precipitates which have settled to the bottom of the settling-tank are disposed of by opening the valve 24, connected with the sludge-piping 22 23 at the bottom of the settling-tank. Precipitates in the lime-water tank L may be washed out at intervals through a discharge-pipe 25, provided with a valve 26. With our improved apparatus a minimum amount of water is consumed in disposing of the precipitates.

The chemicals which are required and the proportion thereof to the amount of water to be treated depend upon the impurities contained in the water and the amount thereof. One hard limestone-water which we have successfully purified requires for treatment approximately four pounds of fresh lime and one-half pound of soda-ash for one thousand (1,000) gallons of raw water. With a plant which we have erected for the treatment of this water having a capacity of thirty-five thousand (35,000) gallons per hour, upward of two thousand (2,000) pounds per day of encrusting calcium and magnesium salts are removed.

To carry the process into most effective operation, we employ a plant having in its various parts ample capacity to insure, first, the use of only clear and saturated lime-water; second, complete reaction of the chemicals; third, thorough settling with an upward movement of water so slow that none or almost none of the precipitates reaches the filter, thus rendering it unnecessary to renew the filtering material except at very long intervals.

By superposing the tank L over the tank R or the tank R over the tank L it is possible to obtain a lime-water tank having a far greater area as compared with the capacity of these two tanks than would be possible if the tanks were placed side by side or one tank within the other. In order to obtain effective results, it is necessary that the lime-water tank should have a large bottom area, so that the water in this tank will rise very slowly and the particles of undissolved lime will not be carried into the pipe 18. By the construction shown a lime-water tank having a suitable bottom area is provided without increasing the ground area of the apparatus, and a head of water is provided to effect the constant passage of water by gravity through the reaction-tank and to the level of the discharge-opening at the top of the settling-tank. By using a long mixing-pipe 18 of comparatively small diameter a mingling of the raw water, lime-water, and chemical reagent is effected before the reaction-tank is reached.

The provision of a sludge-pipe having branches provided with intake-openings distributed over the bottom of the settling-tank, such sludge-pipe and its branches having a respectively greater capacity than all of the intake-openings leading thereto, insures a uniform pressure at each of the intake-openings and the removal of practically all the precipitates which have fallen to the bottom of the tank with a minimum waste of water for flushing purposes.

While we have for the purpose of illustration shown and described a particular apparatus which has been successfuly used in carrying our invention into effect, it is to be borne in mind that the invention is not restricted to particular details in construction of the apparatus, but that such details may be modified in various ways without departing from the essential characteristics of the invention.

Having thus described our invention, the following is what we claim as new therein and desire to secure by Letters Patent:

1. In an apparatus for softening and purifying water the combination of a lime-water tank and a reaction-tank superposed one on the other, a settling-tank separate from the reaction-tank, a vat and connections for supplying milk of lime to the lower part of the lime-water tank, means for supplying raw water in separate streams of regulated relative volume and for conducting one portion to the lower part of the lime-water tank, a mixing-pipe communicating with the reaction-tank, means for conducting the other portion of the raw water, and the lime-water from the lime-water tank, to the mixing-pipe, a vat for preparing chemical-reagent solution, means for conducting the reagent solution in regulated quantity to the mixing-pipe whereby raw water and lime-water and chemical reagent are mingled before reaching the reaction-tank and means for conducting treated water from the reaction-tank to the settling-tank, substantially as described.

2. In an apparatus for softening and purifying water the combination of a lime-water tank and a reaction-tank superposed one on the other, a settling-tank separate from the reaction-tank, a vat and connections for supplying milk of lime to the lower part of the lime-water tank, means for supplying raw water in separate streams of regulated relative volumes and for conducting one portion to the lower part of the lime-water tank, a mixing-pipe communicating with the reaction-tank, means for conducting raw water, and the lime-water from the lime-water tank, to the mixing-pipe, a vat for preparing chemical reagent solution, means for conducting the reagent solution in regulated quantity to the mixing-pipe whereby raw water and lime-water and chemical reagent are mingled before reaching the reaction-tank, mechanical agitators in the reaction-tank, a water-motor in the upper part of the apparatus through which the raw water passes, connections between the water-motor and the mechanical agitators in the reaction-tank and means for conducting treated water from the reaction-tank to the settling-tank, substantially as described.

3. In an apparatus for softening and purifying water the combination of a lime-water tank and a reaction-tank, superposed one on the other, a settling-tank separate from the reaction-tank, a vat and connections for supplying milk of lime to the lower part of the lime-water tank, means for supplying raw water in separate streams of regulated volume and for conducting one of said streams to the lower part of the lime-water tank, a mixing-pipe communicating with the reaction-tank, means for conducting the other stream of raw water and the lime-water from the lime-water tank to the mixing-pipe, a vat for preparing chemical reagent solution, and means for conducting the chemical reagent solution in regulated quantity to the mixing-pipe whereby raw water and lime-water and chemical reagent are mingled in definite proportions before reaching the reaction-tank, a float and valve-regulator automatically controlling the supply of raw water in accordance with the quantity of treated water used, a regulating-box through which raw water is delivered for treatment having one or more delivery-passages, the discharge of water through which varies in accordance with the height of water in said regulating-box whereby the volume of water passing through the apparatus varies according to the height of water in the regulating-box, a regulating-valve in the chemical-reagent tank, means for conveying the reagent from the reagent-tank to the mixing-pipe, whereby the passage of reagent solution is automatically controlled relatively to the quantity of water passing through the apparatus and means for conducting treated water from the reaction-tank to the settling-tank, substantially as described.

4. In an apparatus for softening and purifying water the combination of an inlet for raw water in the upper part of the apparatus, means for separating the flow of raw water into two streams of regulated relative volume, a lime-water tank and means for conducting one of the streams of raw water thereto, a vat for slaking and dissolving lime and means for conducting milk of lime therefrom to the lower part of the lime-water tank, a reaction-tank and mechanically-operated agitators therein a mixing-pipe leading to the reaction-tank to which the other stream of raw water is supplied, an overflow-chute from the upper part of the lime-water tank to the mixing-pipe, a vat for a chemical reagent and means for conducting reagent solution therefrom to the mixing-pipe, a settling-tank separate from the reaction-tank, means for conducting treated water from a part of the reaction-tank, remote from the point where the mixed raw water, reagents and lime-water enter the same, and for delivering said treated water to the lower part of the settling-tank, and means for delivering purified water from the upper part of the settling-tank, substantially as described.

5. In an apparatus for softening and purifying water the combination of a supply-pipe for raw water in the upper part of the apparatus, a box to which raw water is supplied, a water-wheel in said box, gates dividing the water into two streams of regulated proportions, issuing from the lower part of the water-wheel box, a lime-water tank, means for delivering one stream of raw water thereto, a stirrer mounted on a shaft in the lime-water tank, a reaction-tank, agitators mounted on a shaft in the reaction-tank, driving connections rotating the stirrer, in the lime-water tank and the agitators in the reaction-tank by power from the water-wheel, a lime-vat for slaking and dissolving lime, a conduit delivering milk of lime therefrom to the lime-water tank, a mixing-pipe discharging into the reaction-tank, a conduit delivering the second stream of raw water to the mixing-pipe, means for delivering chemical reagent solution from a suitable source and lime-water from the lime-water tank to the mixing-pipe and thence to the reaction-tank, one or more settling-tanks separate from the reaction-tank a conduit taking treated water from the reaction-tank at a point remote from that where raw water and lime-water are admitted thereto and delivering the same into the lower part of the settling-tank, and means for delivering purified water from the upper part of the settling-tank, substantially as described.

6. In an apparatus for softening and purifying water, the combination of a lime-water tank and a reaction-tank, superposed one on the other, a mixing-pipe conducting lime-water from the upper part of the lime-water tank to the reaction-tank, mechanically-operated agitators in the reaction-tank, means for supplying raw water to each of said tanks, means for supplying milk of lime to the lime-water tank, means for supplying a suitable chemical reagent to the mixing-pipe, whereby lime-water and chemical reagent are mixed with the principal body of raw water before delivering to the reaction-tank, a settling-tank separate from the reaction-tank and a conduit taking treated water from the reaction-tank at a point remote from where the mixed raw water reagent and lime-water are supplied, and delivering it into the lower part of the settling-tank, substantially as described.

7. In an apparatus for softening and purifying water the combination of a lime-water tank and a reaction-tank superposed one on the other, constituting means for utilizing the total area of the tank as a settling area and the height of water in the upper tank for increasing the total head means for conducting lime-water from the upper part of the lime-water tank to the reaction-tank, means for supplying water to each of said tanks, means for supplying lime to the lime-water tank, means for supplying a suitable chemical reagent to the reaction-tank, a settling-tank and means for conveying treated water from the reaction-tank to the settling-tank, substantially as described.

8. In an apparatus for softening and purifying water, the combination with a lime-water tank of a reaction-tank, a settling-tank, a tank containing chemical reagent or reagents, a mixing-pipe, means for supplying raw water to the lime-water tank and mixing-pipe, and means for conveying the lime-water from the lime-water tank and chemical reagent or reagents from the reagent-tank to the mixing-pipe, means for conveying the contents of the mixing-pipe to the reaction-tank and means for conveying the contents of the reaction-tank to the settling-chamber, substantially as described.

9. In combination with a settling-tank a sludge-discharge pipe having branches distributed over the bottom of the settling-tank provided with numerous intake-openings, all of smaller combined capacity than that of the respective pipes to which they lead, and a main discharge-pipe with which said branches communicate, having a greater capacity than the intake-openings of the branches leading thereto, substantially as described.

10. In an apparatus for softening and purifying water the combination of a lime-water tank and a reaction-tank superposed one on the other, constituting means for utilizing the total area of the tank as a settling-tank and the height of water in the upper tank for increasing the total head means for conducting lime-water from the upper part of the lime-water tank to the reaction-tank, means for supplying water to each of said tanks, means for supplying lime to the lime-water tank, a settling-tank and means for conveying treated water from the reaction-tank to the settling-tank, substantially as described.

11. In an apparatus for softening and purifying water, the combination with a hollow upright cylinder divided into separate compartments, superposed one upon the other, one of which compartments serves as a reaction-tank, another as a lime-water tank, of a settling-tank separated from said hollow cylinder, means for introducing water and lime into the lime-water tank, means for conducting lime-water therefrom to the reaction-tank, means for conducting water to the reaction-tank and means for conducting treated water from the reaction-tank to the settling-tank, substantially as described.

12. In an apparatus for softening and purifying water, the combination of two tanks superposed one upon the other, one of which is a settling-tank, means for conducting water from one tank to the other and constituting means for utilizing the total area of the tank as a settling-tank and the height of the upper tank for increasing the total head, substantially as described.

13. In water softening and purifying apparatus, the combination of two tanks superposed one on the other, one of said tanks acting as a settling-tank and the other as a reaction-tank, means for conducting the contents of one tank to the other tank, the whole constituting means for utilizing the total area of the tank as a settling-tank and the height of liquid in the upper tank for increasing the total head, substantially as described.

Signed at the city of New York, in the county and State of New York, this 27th day of April, 1904.

HARRY HERBERT SUTRO.
LEVIS MILLER BOOTH.

Witnesses:
 EGBERT V. NELSON,
 E. QUINN.